US008661417B2

(12) United States Patent  (10) Patent No.: US 8,661,417 B2
Panchamukhi et al.  (45) Date of Patent: Feb. 25, 2014

(54) DEBUGGING PROGRAM FUNCTION

(75) Inventors: Prasanna S. Panchamukhi, Bangalore (IN); Vaddagiri Srivatsa, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 12/411,736

(22) Filed: Mar. 26, 2009

(65) Prior Publication Data

US 2010/0251026 A1   Sep. 30, 2010

(51) Int. Cl.
 *G06F 9/44* (2006.01)
(52) U.S. Cl.
 USPC ........... 717/130; 717/126; 717/127; 717/128; 717/129
(58) Field of Classification Search
 None
 See application file for complete search history.

(56) References Cited

U.S. PATENT DOCUMENTS

| | | | |
|---|---|---|---|
| 6,249,907 B1 | 6/2001 | Carter et al. | |
| 6,327,700 B1 * | 12/2001 | Chen et al. | 717/127 |
| 6,826,748 B1 * | 11/2004 | Hohensee et al. | 717/130 |
| 6,941,545 B1 * | 9/2005 | Reese et al. | 717/130 |
| 7,013,456 B1 * | 3/2006 | Van Dyke et al. | 717/130 |
| 7,222,264 B2 * | 5/2007 | Muratori et al. | 714/35 |
| 7,584,383 B2 * | 9/2009 | Hopkinson | 714/35 |
| 8,321,840 B2 * | 11/2012 | Nagarajan et al. | 717/126 |
| 2003/0014736 A1 * | 1/2003 | Nguyen et al. | 717/129 |
| 2003/0084375 A1 * | 5/2003 | Moore et al. | 714/34 |
| 2004/0088684 A1 | 5/2004 | Gazdik et al. | |
| 2004/0168156 A1 * | 8/2004 | Hundt et al. | 717/130 |
| 2005/0066313 A1 * | 3/2005 | Bates et al. | 717/129 |
| 2005/0210335 A1 * | 9/2005 | Muratori et al. | 714/35 |
| 2005/0273757 A1 * | 12/2005 | Anderson | 717/100 |
| 2005/0289396 A1 | 12/2005 | Hooper et al. | |
| 2006/0294433 A1 * | 12/2006 | Thelen | 714/38 |
| 2007/0300209 A1 * | 12/2007 | Bates et al. | 717/129 |
| 2008/0126866 A1 * | 5/2008 | Hopkinson | 714/35 |
| 2008/0134148 A1 * | 6/2008 | Clark | 717/128 |
| 2009/0172642 A1 * | 7/2009 | Lai | 717/124 |

OTHER PUBLICATIONS

Josef Fritscher et al, Visualization, Execution Control and Replay of Massively Parallel Programs within Annai's Debugging Tool, 1995 HPCS Canada, pp. 393-404, <http://citeseerx.ist.psu.edu/viewdoc/download?doi=10.1.1.55.7230&rep=rep1&type=pdf>.*
Urs Holzle et al, Debugging optimized code with dynamic deoptimization, 1992 ACM, pp. 32-43, <http://dl.acm.org/citation.cfm?id=143 1n14>.*
Ben L. Titzer et al., Nonintrusive Precision Instrumentation of Microcontroller Software, 2005 ACM, pp. 59-68, <http://dl.acm.org/citation.cfm?id=1065919>.*

(Continued)

*Primary Examiner* — Thuy Dao
*Assistant Examiner* — Cuong V Luu
(74) *Attorney, Agent, or Firm* — Steven L. Bennett

(57) ABSTRACT

A method of debugging a function upon function exit includes pausing program execution at the time of initializing the function, wherein the function initialization includes saving a set of registers on the stack, recording the value of the stack pointer, configuring a watchpoint register based on the recorded value, wherein the watchpoint register is configured to trap memory references of the function based on the recorded value of the stack pointer, and executing the function. Program execution will pause when it is exiting the function because of stack references made by the function epilogue to restore registers saved on the stack and the configured watchpoint registers.

15 Claims, 5 Drawing Sheets

(56) References Cited

OTHER PUBLICATIONS

Kazutaka Maruyama et al., Debugging with Reverse Watchpoint, 2003 IEEE, 8 pages, <http://ieeexplore.ieee.org/stamp/stamp.jsp?tp=&arnumber=1319093>.*

Dae-Young Jung et al., Reusable Embedded Debugger for 32bit RISC Processor Using the JTAG Boundary Scan Architecture, 2002 IEEE, pp. 209-212, <http://ieeexplore.ieee.org/stamp/stamp.jsp?tp=&arnumber=1031569>.*

Michael Golan et al., DUEL A Very High-Level Debugging Language, 1992 USENIX, 17 pages, <http://citeseerx.ist.psu.edu/viewdoc/download?doi=10.1.1.42.7636&rep=rep1&type=pdf>.*

Husar Lubomir, "Monitor your DataStage jobs without Director", http://it.toolbox.com/blogs/traveling-consultant/monitor-your-datastage-jobs-without-director-20418, 2007.

* cited by examiner

DEBUGGING PROGRAM FUNCTION

TRADEMARKS

IBM® is a registered trademark of International Business Machines Corporation, Armonk, N.Y., U.S.A. Other names used herein may be registered trademarks, trademarks or product names of International Business Machines Corporation or other companies. Microsoft® and Windows® is a registered trademark of Microsoft Corporation.

BACKGROUND

Breakpoints are a useful feature of software debuggers that cause program execution to be paused under certain circumstances. Typically, breakpoints specify particular locations in an application or program code where, if control is reached, execution is paused. Modern central processing units (CPUs) also offer ability to watch a program's access to particular memory locations, for example either read/write access or instruction execution. A register in such a CPU may be set to a memory address location. Program execution will pause whenever it accesses the memory address specified in the register. Every CPU will provide few such registers. While debugging a multi-threaded program, a debugger may wish to debug only some threads execution and not others. This is conveniently accomplished by using registers defined above. Every thread will have some execution context associated with it. This context includes the value all the registers used by it, which can include the registers. By setting the value of the register in one thread's context and not in other thread's, per-thread debugging is enabled.

At times, it may be necessary to pause program execution as the program is about to exit a function or when a return to caller is encountered. Accomplishing this using breakpoints requires knowledge of the exit points in a function. While it's sometimes easy to find location (address) of a function entry point, finding all locations (addresses) from where a function can exit is non-trivial. This would require decoding all instructions comprising the function and finding out where the 'return' instructions are present, which can be time consuming and compromise on efficiency, especially when large function bodies are considered. Also in case of multi-threaded applications and in a system with multiple CPU's, sometimes programmers tend to debug only a particular thread of that application and not all threads. Consequently programmers may require the function exit to be traced only when that particular thread being debugged hits a function exit point. Accomplishing this per-thread debugging facility using registers would require as many registers as the number of exit points. If the number of exit points in a function is more than the number of registers available, then it becomes difficult and complicated to debug the function exit for selective threads using the registers.

BRIEF SUMMARY

Embodiments of the invention are directed to debugging programs, and more particularly, to methods of debugging program without using breakpoints, for example, during a return to caller.

An embodiment of the invention includes a method of debugging a function upon function exit. The method includes pausing/halting program execution when the program is initializing the function by using either breakpoints or watchpoint registers, the function initialization includes saving a set of registers on the stack, recording a value of the stack pointer, configuring a watchpoint register based on the recorded value of stack pointer, and the watchpoint register is configured to trap memory references of the function based on the value of the stack pointer, and executing the function. Function execution will pause when it access the same stack location during its exit.

In a further embodiment of the invention includes a system. The system includes a function to be debugged and a debugger application in operative communication with the function and configured to perform a method. The method includes pausing program execution when it is initializing the function by using either breakpoints or watchpoint registers, wherein function initialization includes saving a set of registers, recording the value of the stack pointer, configuring a watchpoint register based on the recorded value, wherein the watchpoint register is configured to trap memory references of the function based on the location of the stack pointer, and executing the function. Function execution will pause when it access the same stack location during its exit.

BRIEF DESCRIPTION OF THE SEVERAL VIEWS OF THE DRAWINGS

These and other features, aspects, and advantages of the present invention will become better understood as the following detailed description is read with reference to the accompanying drawings in which like reference numerals represent like elements throughout the drawings, wherein.

DETAILED DESCRIPTION

Figure 1:
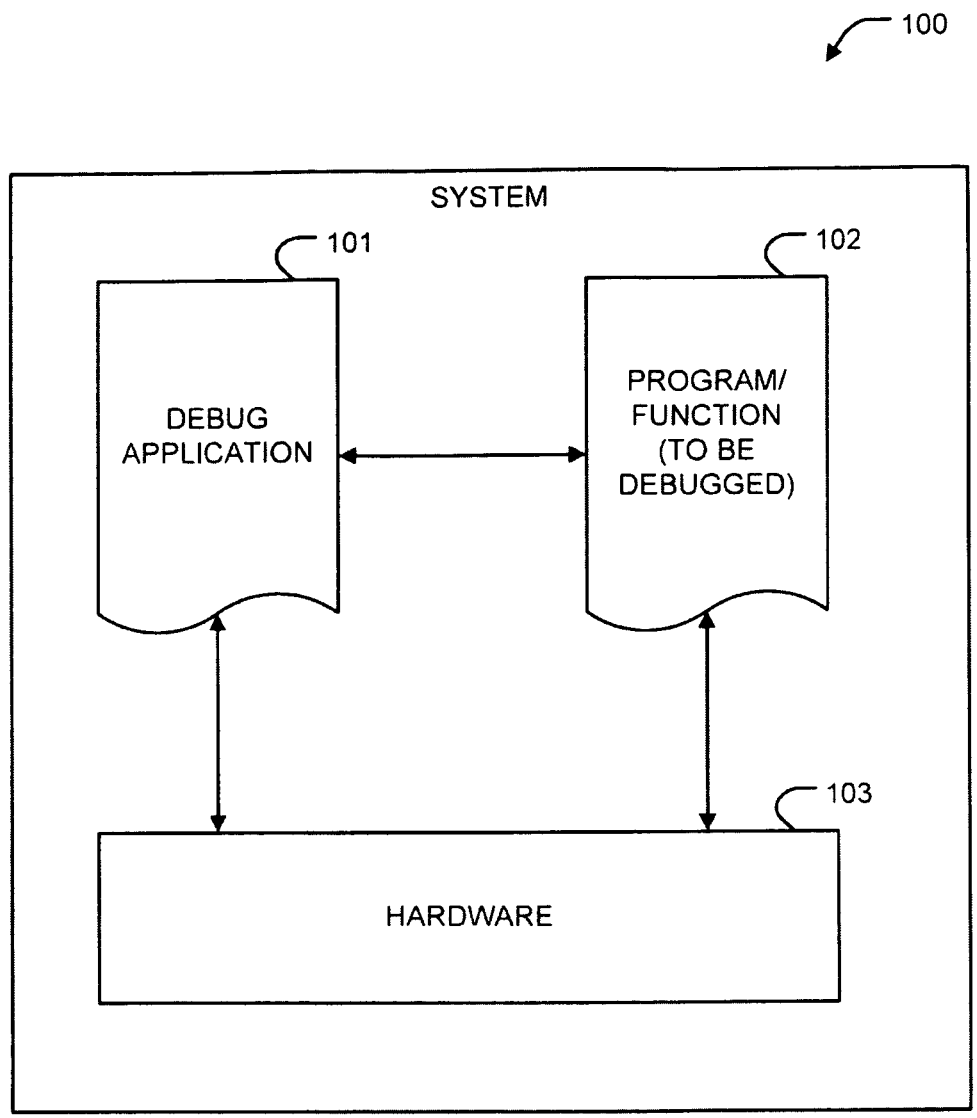
FIG. 1 illustrates an example system, according to an example embodiment.

Detailed embodiments are illustrated herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It should be understood that, although the terms first, second, etc. may be used herein to describe various steps or calculations, these steps or calculations should not be limited by these terms. These terms are merely used to distinguish one step or calculation from another. For example, a first calculation could be termed a second calculation, and, similarly, a second step could be termed a first step, without departing from the scope of the embodiments of the invention disclosed herein. As used herein, the term "and/or" and the "/" symbol includes any and all combinations of one or more of the associated listed items.

As used herein, the singular forms "a" "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. Furthermore, some steps, blocks, or portions of a methodology may be performed in alternate or reverse order depending upon any particular implementation requiring such modification.

Hereinafter, example embodiments of the invention will be described in detail. According to the exemplary embodiments, a solution is provided which discloses a new and novel solution to the problem of "stop when a function exits". Example embodiments operate based on the feature that before a function returns to the caller, it will need to make certain memory references. These memory references are to the stack addresses where certain registers (e.g., register % ebp) are saved as part of function prologue(s). If a function is returning said function needs to restore those registers, and hence will need to access the stack where those registers have been saved. A configured watchpoint register traps these references, thereby halting execution of the function upon exit.

Accordingly, the technical effect of example embodiments is a decrease in the complexity of according a pause or 'stop execution' for functions returning to callers or exiting in general. This decrease in complexity affords smoother debugging and troubleshooting of functions/programs.

According to example embodiments, as a function is paused at the time of its initialization, a debugger can note/record the position of the stack pointer and setup a watchpoint register to trap references to this address. Upon saving/recording the register, the function continues executing. The CPU will automatically stop when function is exiting because of memory references made to the stack during function exit due to the watchpoint register configured by the debugger of example embodiments.

Accordingly, no knowledge of the executable file format required to locate addresses of return instructions; disassembly of instructions at runtime is not required to find addresses of return instructions; the methodologies make optimum use of hardware resources (i.e., one watchpoint register is configured irrespective of the number of return instructions in the function). Furthermore, the technique may be applied in all architectures where a defined memory reference pattern exists as part of function epilogue.

Typically hardware-assisted breakpoints, such as the watchpoints disclosed herein, modify an instruction where the breakpoint is inserted. The original instruction is replaced with a special trap/break instruction. When the CPU executes this special trap instruction, an exception is raised which passed control to the debugger. This scheme has the drawback that such a breakpoint is visible to all the CPUs present in the system. Any CPU that executes the trap instruction will stop and pass control to the debugger.

It may be necessary for only one CPU see the breakpoint and not others (e.g., if a thread running on a CPU needs to be traced). This can be accomplished by using hardware-assisted watchpoints. Here each CPU provides a number of watchpoint registers (typically 3 or 4). These registers can be used to monitor either instruction execution or memory references. If the CPU executes an instruction at a particular address or if the CPU reads from/writes to a particular memory location, then it can be made to stop at that point. Using this facility, a per-CPU breakpoint mechanism may be configured.

In order to further understand example embodiments, descriptions accompanied by references to the several figures follows below.

FIG. 1 illustrates a debugging system, according to an example embodiment. The system 100 includes a debug application 101, a program/function to be debugged 102, and hardware resources 103.

The debug application 101 and the function 102 may be in operative communication through the hardware resources 103 (e.g., read/writes to memory, CPU registers, etc), or may be in direct communication through other means. If the function 102 is actively debugged through debug application 101, debug application 101 may monitor the state of function 102, apply break-points or other control mechanisms, and afford a halt when program function 102 exits through use of a watchpoint register applied in hardware resources 103. Therefore, a system somewhat similar to system 100 may be utilized in implementation of at least one example methodology as described herein.

Figure 2A:
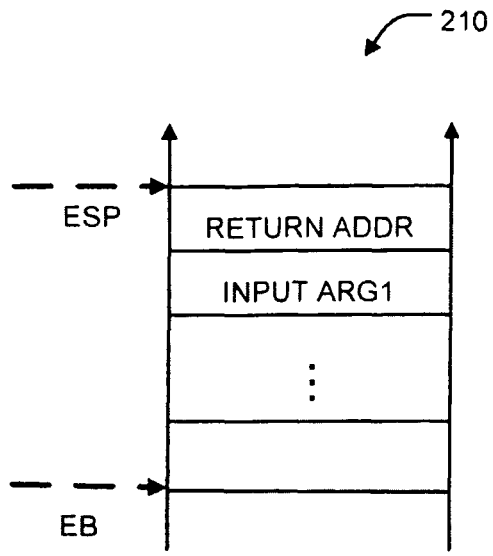
FIG. 2A illustrates an example stack layout, according to an example embodiment.
Figure 2B:
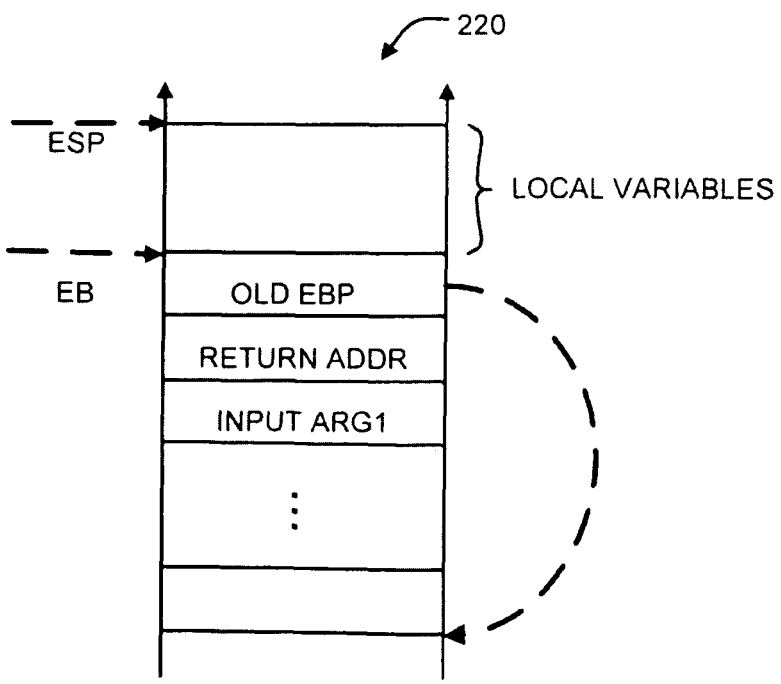
FIG. 2B illustrates an example stack layout, according to an example embodiment.

Turning now to FIGS. 2A and 2B, example stack contents during execution of a simple function 'foo' are illustrated. Stack 210 represents the stack at the time of the prologue or initialization of the function 'foo', while stack 220 represents the stack during the execution of the function 'foo'. The example function 'foo' is provided below in Table 1. It is noted that this is a simple example function only, and is in no way limiting of example embodiments.

TABLE 1 int foo (int a) {
   int i=a;
   char buf[100];
   i *= 2;
   return i;}

The function 'foo' returns twice the value of an argument passed to it. It also declares a local array buffer of size 100 bytes. If the function were compiled for Intel x86 architecture, the following code shown in Table 2 would be established:

TABLE 2

| foo: | pushl | %ebp |
|---|---|---|
| | movl | %esp, %ebp |
| | subl | $112, %esp |
| | movl | 8(%ebp), %eax |
| | movl | %ebp, %esp |
| | addl | %eax, %eax |
| | popl | %ebp |
| | ret | |

The various registers that are used above have following significance. Register % ebp serves as a frame pointer. It is normally used while performing stack unwind operations. The register % esp serves as stack pointer. The register % eax serves as general purpose register. Noted from the assembly code of Table 2, the function initialization includes saving the current value of frame pointer (% ebp) on stack and it is changed to point to this saved position on stack; % esp is decremented by 112 bytes (This sets apart space for local variables present in foo); the value of input argument is doubled and saved in % eax register; and, finally, before the function returns, % ebp register is restored from stack and the ret instruction is executed to return control to the caller.

Figure 3:
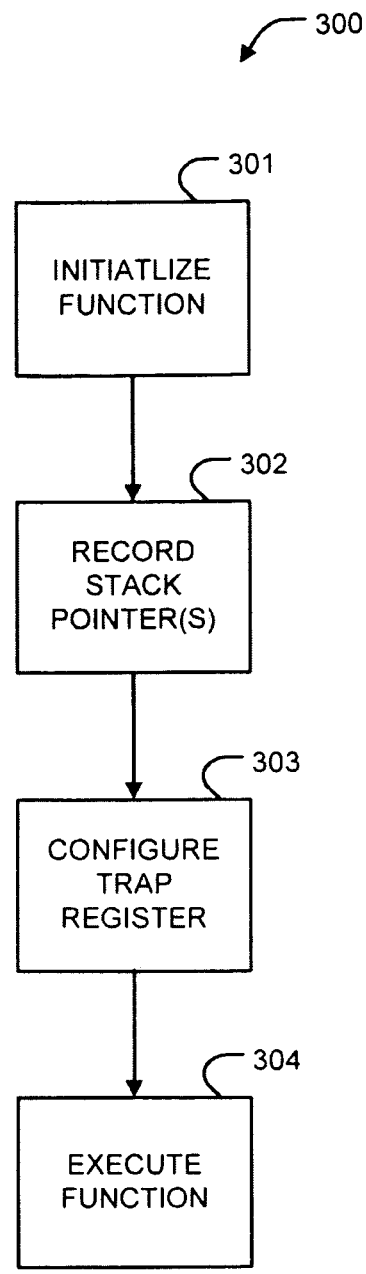
FIG. 3 illustrates a debugging method, according to an example embodiment.

Turning now to FIG. 3, a debug method 300 is illustrated according to an example embodiment. The method 300 includes pausing program execution when it is initializing a function at block 301. During initialization, frame pointers, stack pointers, and other items may be initialized. Also some registers are typically saved on the stack. For reference, see FIGS. 2A and 2B. Accordingly, stack pointer(s) value at the time of initialization of a function may be recorded such that watchpoint register(s) may be configured (see 302 and 303). Upon exit of the function, the stack is accessed to restore registers whose initial values were saved on the stack at function prologue time. The configured watchpoint register traps this reference as the function exits. FIG. 3 further includes executing the function at block 304. It follows that as the stack pointer(s) is recorded and watchpoint register(s) is configured, the function may be executed such that it may return or exits upon completion, thereby accessing stack before exiting, and being halted due to the configured watchpoint register.

Figure 4:
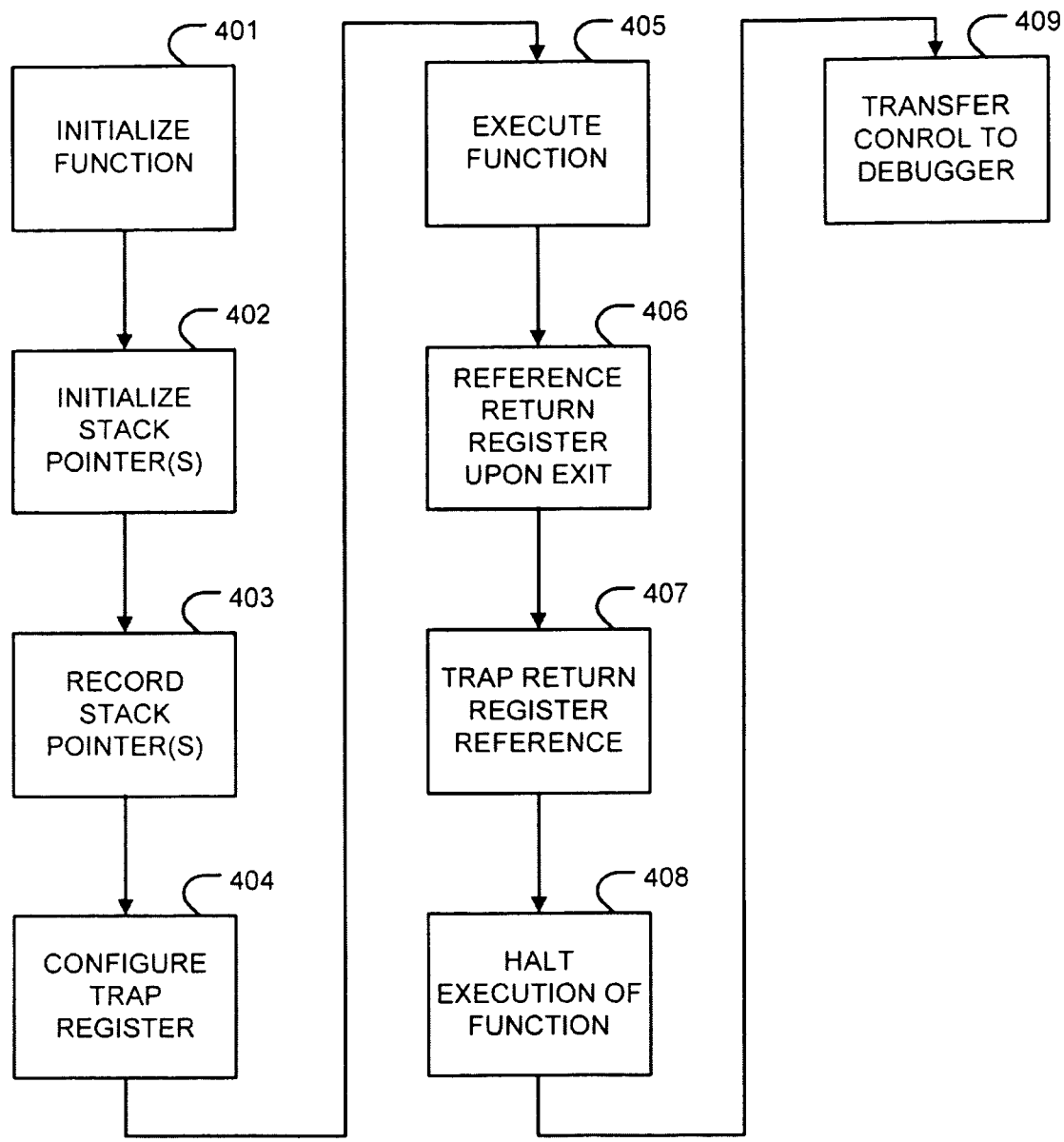
FIG. 4 illustrates a debugging method, according to an example embodiment.

Reference is now made to FIG. 4, a debug method is illustrated according to an example embodiment. The method 400 includes pausing program execution when it is initializing a function at block 401. During initialization, frame pointers, stack pointers, and other items may be initialized. Also some registers are typically saved on the stack. Accordingly, stack pointer(s) value at the time of initialization of a function may be recorded such that watchpoint register(s) may be configured (see 402, 403, and 404). Upon exit of the function, the stack is accessed to identify a return address. The configured watchpoint register traps this reference as the function exits. FIG. 4 further includes executing the function at block 405.

The method 400 further includes referencing stack upon exit at block 405. This is done to restore certain registers whose initial value was saved on the stack during function initialization. This reference to stack may be trapped at block 406 due to the configured watchpoint register (see 403). Thus, the method 400 further includes halting execution of the function at block 407. Upon halting, control is transferred to the debugger at block 408. For example, the debugger may use control to access memory values using the functions stack pointer, and therefore may debug the function.

Therefore, according to example embodiments, a solution is provided which presents a new and novel solution to the problem of "stop when a function exits". Example embodiments operate based on the feature that before a function returns to the caller, it will need to make certain memory references. These memory references are to the stack addresses where certain registers (e.g., register % ebp) are saved as part of function prologue(s). If a function is returning said function needs to restore those registers, and hence will need to access the stack where those registers have been saved. A configured watchpoint register traps these references, thereby halting execution of the function upon exit.

Figure 5:
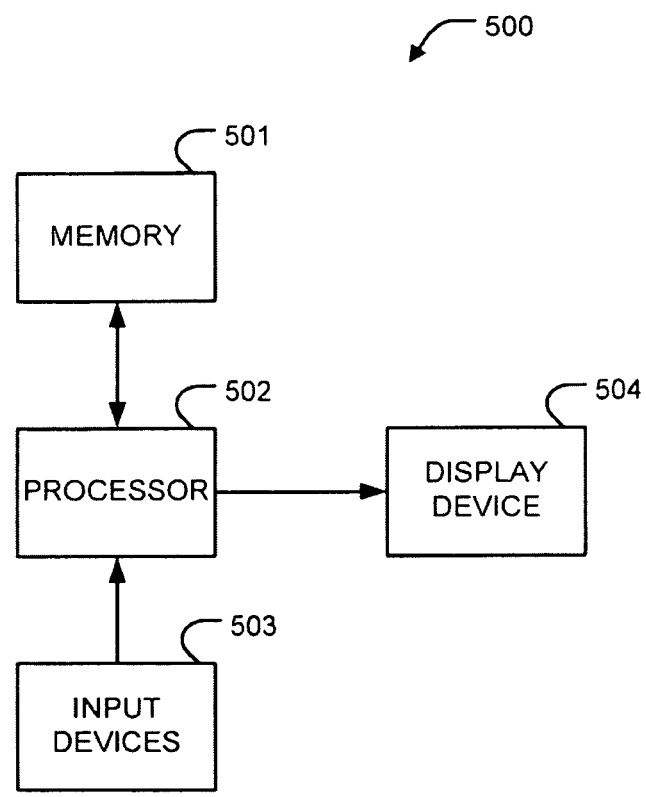
FIG. 5 illustrates a computer apparatus, according to an example embodiment.

Furthermore, according to an exemplary embodiment, the methodologies described hereinbefore may be implemented by a computer system or apparatus. For example, FIG. 5 illustrates a computer apparatus, according to an exemplary embodiment. Therefore, portions or the entirety of the methodologies described herein may be executed as instructions in a processor 502 of the computer system 500. The computer system 500 includes memory 501 for storage of instructions and information, input device(s) 503 for computer communication, and display device 504. Thus, the present invention may be implemented, in software, for example, as any suitable computer program on a computer system somewhat similar to computer system 500. For example, a program in accordance with the present invention may be a computer program product causing a computer to execute the example methods described herein.

The computer program product may include a computer-readable medium having computer program logic or code portions embodied thereon for enabling a processor (e.g., 502) of a computer apparatus (e.g., 500) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the invention.

With only some example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. A method for debugging in a computer system a function in an application upon function exit, the method comprising:
   pausing execution of the application on entering a function, the function being part of the application under execution;
   determining a location of a variable stored in a stack, the location corresponding to the function exit of the function in the application, wherein the variable chosen can be read by a central processing unit before the function exits;

inserting a watchpoint on the variable stored in the stack, wherein the watchpoint is inserted via using the single watchpoint register of the one CPU further without requiring a user to manually identify each of a plurality of function exits of the function, the watchpoint instructs the central processing unit to pause execution of the application on encountering the variable chosen on the stack, such that the execution of the application is paused upon the function exit of the function in the application, the watchpoint being a per-CPU breakpoint mechanism, the watchpoint visible to just one CPU of the computer system executing a thread of the application requiring tracing, and not any other CPU of the computer system, the watchpoint being inserted via using a single watchpoint register of the one CPU regardless of a number of function exits including the function exit within the function; and resuming normal execution of the application.

2. The method of claim 1, wherein the variable stored in the stack is a return address.

3. The method of claim 1, further comprising
inserting a breakpoint on entry of a function in an application, wherein the breakpoint indicates the application to pause execution.

4. The method of claim 1, wherein the application pauses execution when the CPU accesses the variable on the stack location during function exit.

5. The method of claim 1, wherein the watchpoint can be implemented using at least one of a hardware support or software implemented.

6. The method of claim 1, wherein a debugger is configured to define a watchpoint to be executed when a function returns.

7. The method of claim 1, further comprising
removing the watchpoint; and
continuing execution of the application.

8. A method of debugging a function in an application upon function exit, comprising:
pausing execution of the application on entering a function;
determining location of a variable in a stack, the location corresponding to the function exit of the function in the application, wherein the variable chosen can be read by the central processing unit before the function exits;
inserting a watchpoint on the variable stored in the stack, wherein the watchpoint is inserted via using the single watchpoint register of the one CPU further without requiring a user to manually identify each of a plurality of function exits of the function, the watchpoint instructs the central processing unit to pause execution of the application on encountering the variable chosen on the stack, such that the execution of the application is paused upon the function exit of the function in the application, the watchpoint being a per-CPU breakpoint mechanism, the watchpoint visible to just one CPU of the computer system executing a thread of the application requiring tracing, and not any other CPU of the computer system, the watchpoint being inserted via using a single watchpoint register of the one CPU regardless of a number of function exits including the function exit within the function;
resuming normal execution of the application;
referencing stack at function exit to restore saved variables;
trapping any memory references using the watchpoint register;
pausing execution of the function in response to the trapping; and
transferring control to a debugger application in response to the halting.

9. A system comprising:
a central processing unit comprising hardware;
a computer-readable data storage medium;
a function to be debugged, stored on the computer-readable data storage medium, and executable by the central processing unit; and
a debugger application stored on the computer-readable data storage medium, in operative communication with the function, and configured to perform upon being executed by the central processing unit:
pausing execution of an application on entering a function, the function being part of the application under execution;
determining a location of a variable stored in a stack, the location corresponding to function exit of the function in the application, wherein the variable chosen can be read by the central processing unit before the function exits;
inserting a watchpoint on the variable stored in the stack, wherein the watchpoint is inserted via using the single watchpoint register of the one CPU further without requiring a user to manually identify each of a plurality of function exits of the function, the watchpoint instructs the central processing unit to pause execution of the application on encountering the variable chosen on the stack, such that the execution of the application is paused upon the function exit of the function in the application, the watchpoint being a per-CPU breakpoint mechanism, the watchpoint visible to just one CPU of the computer system executing a thread of the application requiring tracing, and not any other CPU of the computer system, the watchpoint being inserted via using a single watchpoint register of the one CPU regardless of a number of function exits including the function exit within the function; and
resuming normal execution of the application.

10. The system of claim 9, wherein the variable stored in the stack is a return address.

11. The system of claim 9, wherein the debugger is further configured to perform
inserting a breakpoint on entry of a function in an application, wherein the breakpoint indicates the application to pause execution.

12. The system of claim 9, wherein the application pauses execution when the CPU accesses the variable on the stack location during function exit.

13. The system of claim 9, wherein the watchpoint can be implemented using at least one of a hardware support or software implemented.

14. The system of claim 9, the wherein debugger is configured to define a watchpoint to be executed when a function returns.

15. The system of claim 9, wherein the debugger is further configured to perform
removing the watchpoint; and
continuing execution of the application.

* * * * *